(No Model.)

A. A. TRIPOLD.
PACKING RING FOR PISTONS.

No. 549,170. Patented Nov. 5, 1895.

Witnesses:
J. Staib
Chas H. Smith

Inventor:
Ambrose A. Tripold
per
Lemuel W. Serrell
Atty.

UNITED STATES PATENT OFFICE.

AMBROSE A. TRIPOLD, OF BROOKLYN, NEW YORK.

PACKING-RING FOR PISTONS.

SPECIFICATION forming part of Letters Patent No. 549,170, dated November 5, 1895.

Application filed June 22, 1894. Renewed April 5, 1895. Serial No. 544,619. (No model.)

*To all whom it may concern:*

Be it known that I, AMBROSE A. TRIPOLD, a citizen of the United States, residing at Brooklyn, in the county of Kings and State of New York, have invented an Improvement in Packing-Rings for Pistons, of which the following is a specification.

In Letters Patent No. 473,182 packing-rings are represented to be applied upon a piston and to be expanded to fill the interior of the cylinder, one ring lapping upon another in such a manner that the flat surfaces coming together prevent the steam passing by the packing, but the steam will act to press the packing-rings outwardly against the interior of the cylinder.

The present invention is a modification of the devices shown in the aforesaid patent, the object being to introduce the packing-rings near the middle of the piston, which in many instances is much more convenient than it is toward the ends of the piston, because in some cylinders the interior surface of the cylinder is counterbored near the ends of the cylinder and in such a position that the packing-rings, when located near the ends of the piston, may pass beyond the internal diameter of the cylinder into the counterbored portion, whereas when the packing-rings are near the middle of the piston such rings remain upon the interior surface of the cylinder and do not pass to the counterbored portion. This is a great convenience in fitting the packing-rings into pistons and cylinders already constructed.

Figure 1:
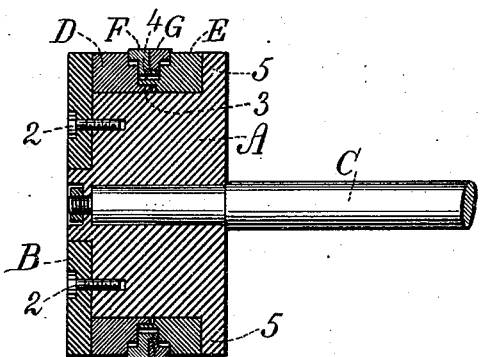
Figure 2:
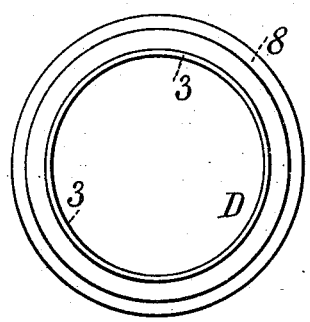
Figures 4, 5:
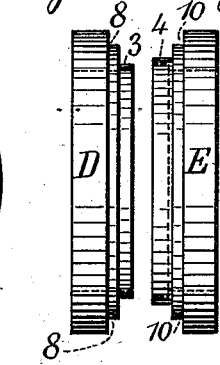
Figure 3:
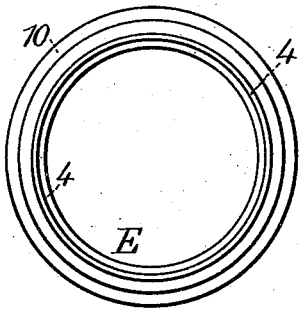
Figure 6:
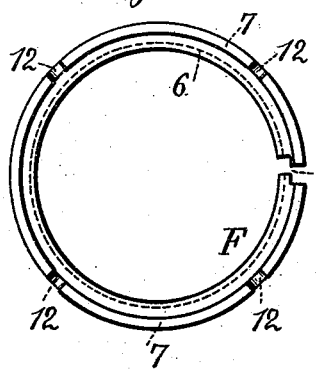
Figures 7, 8, 9:
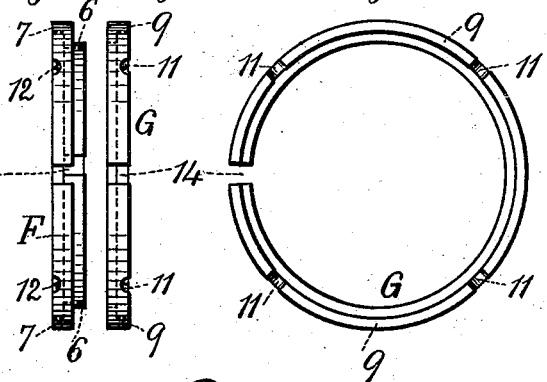
Figure 11:
Figure 10:
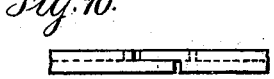

In the drawings, Figure 1 is a section of a piston with the rings in place. Figs. 2 and 3 are side views, and Figs. 4 and 5 are edge views, of the filling-rings of the piston. Figs. 6 and 7 are side views, and Figs. 8 and 9 are edge views, of the improved packing-rings. Figs. 10 and 11 represent modifications in the lap-joint.

The piston is composed of the body portion A and the follower B, secured to the piston by screws 2 or otherwise, and C represents the piston-rod, and the space which is usually provided for packing around the piston is filled by the filling-rings D E and the packing-rings F G. The filling-rings D E are not split, but they fit reasonably tight around the body A of the piston, and upon the filling-ring D there is an annular flange 3, passing into a recess within the annular flange 4, so that these parts set together tightly, but the rings can separate by the action of the steam-pressure sufficiently to set steam-tight against the flat face of the follower B or flat face of the annular flange 5 of the body A of the piston, and the packing-ring F is made with an annular flange 6, setting within the packing-ring G, and it is made with an annular recess and a flange 7 at the opposite side, the flange 7 setting into the annular shoulder 8 upon the filling-ring D, and the packing-ring G is made with a flat face setting against the flat face of the packing-ring F, and it is also made at the opposite side with an annular recess and a flange 9, setting into the annular recess 10 of the filling-ring E, and the edges of the flange 9 are notched at 11, and the edges of the flange 7 are notched at 12, so as to admit steam through these notches to act between the packing-ring F and the filling-ring D and between the packing-ring G and the filling-ring E. Hence the two flat surfaces of the packing-rings F and G will be kept together, no matter which side of the packing-rings the steam-pressure may act against, because in use the steam-pressure will act first through the notches 12 when the piston is going in one direction and then through the notches 11 when the piston is going in the other direction.

In order to make the rings F and G expansive, so that they may set tightly within the cylinder, each ring is split, the ring G being shown as split at 14 by a plain incision, and the ring F is shown as split at 15 by a compound incision, the ring being sawed inwardly from the outside and outwardly from the inside, so as to form an offset or shoulder in the incision.

It is now to be understood that when the rings F and G are put together they are turned in such a manner that the incision 14 comes at a different place from the incision 15. It is preferable that one incision be at one side of the piston and the other incision at the other side of the piston, and the packing-rings when in use will not admit steam to pass by them, because the pressure of the steam acting at opposite sides of the packing-rings F and G brings their flat faces firmly against each other, and the pressure at one side moves both packing-rings toward the filling-ring at the other side, causing the offsets or shoulders to take a close bearing one upon the other and form a tight joint.

If desired, either one ring or the other may be sawed open in the manner represented in Fig. 10, the point of separation being zigzag, with one line parallel to the edges of the ring and the other incisions at right angles to form tongues and allow for the tongues sliding one upon the other, and the filling-plate 16 is introduced behind the tongues and of a width corresponding to the width of the inner edge of the ring, so as to cover the openings that are at right angles to the edges of the ring.

I claim as my invention—

1. The combination in a piston with the rings D E having the annular flanges 3 and 4 that set one into the other, and the intermediate groove, of the split expansive packing rings F and G received into the groove between the rings D E, there being an annular flange on the inner edge of one of the split rings setting into a corresponding groove in the other ring, substantially as specified.

2. The combination in a piston with the rings D E having the annular flanges 3 and 4, which set one into the other, and the intermediate groove with the shoulders 8 and 10, of the split expansive packing-rings F and G received into the groove between the rings D and E, there being an annular flange on the inner edge of one of the split rings setting into a corresponding groove in the other ring, and annular flanges on the split rings setting over the shoulders of the rings D and E, substantially as specified.

Signed by me this 19th day of June, 1894.

AMBROSE A. TRIPOLD.

Witnesses:
GEO. T. PINCKNEY,
WILLIAM G. MOTT.